United States Patent [19]

Oshima

[11] 3,783,381

[45] Jan. 1, 1974

[54] RECTIFIER CIRCUIT USING MOS FIELD EFFECT TRANSISTOR

[76] Inventor: Masakazu Oshima, 1529 Nakashinden, Ebina-shi, Kanagawa-ken, Japan

[22] Filed: May 31, 1972

[21] Appl. No.: 258,270

[30] Foreign Application Priority Data

May 31, 1971 Japan .............................. 46/36975

[52] U.S. Cl. .................. 324/132, 307/251, 307/304

[51] Int. Cl.... G01n 15/10, H03k 17/60, H03k 3/26

[58] Field of Search .................... 324/132; 307/304, 307/230, 251; 328/144, 26

[56] References Cited

FOREIGN PATENTS OR APPLICATIONS 1,809,922 6/1970 Germany ........................... 307/304

OTHER PUBLICATIONS

Elliott, IBM Tech. Dis. Bul., June, 1964 p. 111.

*Primary Examiner*—Alfred E. Smith
*Attorney*—Raymond C. Stewart et al.

[57] ABSTRACT

A rectifier circuit, comprising the combination of a MOS field effect transistor and an amplifier, in which non-linearity in the input a-c voltage versus output d-c current characteristic in the low voltage region, such as encountered in the conventional diode rectifier circuit, is improved, thus realizing linearity down to millivolt range.

4 Claims, 7 Drawing Figures

RECTIFIER CIRCUIT USING MOS FIELD EFFECT TRANSISTOR

BACKGROUND OF THE INVENTION

1. Field of the Invention

The present invention relates to rectifier circuits using MOS field effect transistors, and more particularly to a rectifier circuit comprising the combination of a MOS field effect transistor and an amplifier.

2. Description of the Prior Art

The conventional rectifier circuit using a diode entails a non-linear input-output characteristic in the low input a-c voltage range. This is why the diode element used tends to fail in linear rectification on low voltages below several hundred millivolts. Hence it is apparent that the conventional rectifier circuit is not suited for use in the measurement of a quantity such as sound-pressure or vibration-displacement whose amplitude varies from its minimum to maximum value by a factor of several tens to several hundreds.

SUMMARY OF THE INVENTION

Solving the prior art problems, the present invention has for its principal object a provision of an improved rectifier circuit using a MOS field effect transistor, with the capability of maintaining linearity in the input a-c voltage versus the rectified output current characteristic even in the range of low input a-c voltage.

DESCRIPTION OF THE PREFERRED EMBODIMENTS

Figure 1:
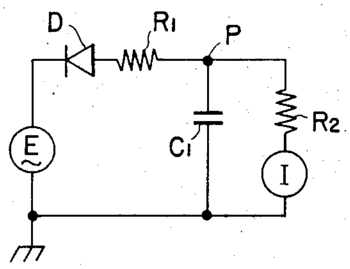
FIG. 1 schematically shows a conventional quasi-RMS indicating rectifier circuit using a usual diode element.

Referring to FIG. 1, there is shown a conventional approximated effective value or so called quasi-RMS indicating rectifier circuit comprising a diode D, resistors $R_1$ and $R_2$, a capacitor $C_1$, and an input a-c voltage source E. This circuit is characterized in that the value of resistor $R_1$ is determined to be about half the value of $R_2$ whereby even when the input voltage involves a relatively large wave-distortion factor, the rectified output current I flowing through the resistor $R_2$ or the voltage emerging at the point P becomes almost equal to the current or voltage rectified from sinusoidal input voltages having equal effective values. Because of this feature, the circuit as in FIG. 1 is used widely as a simple approximated effective value or quasi-RMS indicating circuit for the measurement of sound, vibration, etc.

Figure 2:
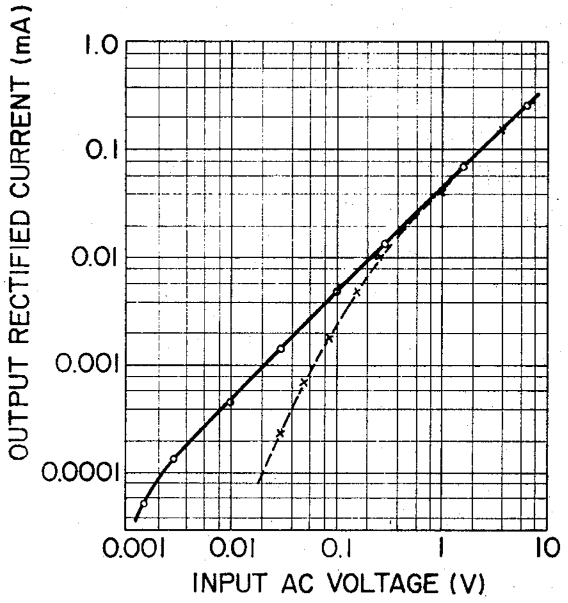
FIG. 2 is a diagram showing the characteristic of a rectifier circuit of this invention, in comparison with that of the prior art, FIGS. 3a and 3b schematically show the shift of the grounding point of a conventional rectifier circuit, and a partly modified circuit arrangement thereof, FIGS. 4a and 4b schematically show a rectifier circuit embodying this invention, and FIG. 5 schematically shows a concrete example of the rectifier circuit of this invention.

In the rectifier circuit using a diode element D as in FIG. 1, the input-output linearity of the rectifying characteristic is not straight as indicated by the dotted line in FIG. 2 when the input a-c voltage is low. A principal aim of this invention is to obviate the foregoing prior art drawbacks.

Figure 3A:
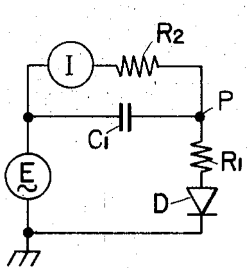
Figure 3B:
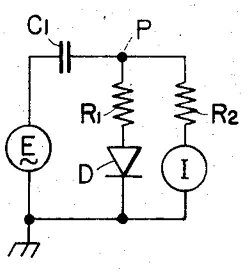
Figure 4A:
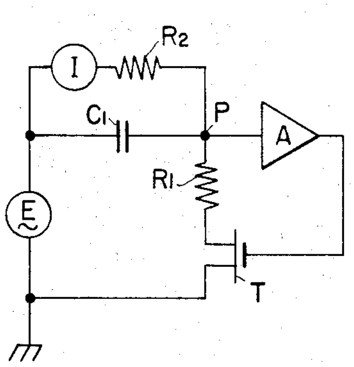
Figure 4B:
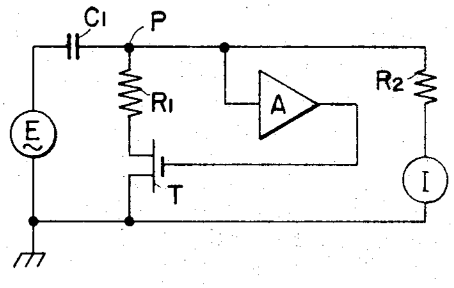

Further view of the conventional rectifier circuit will be taken with reference to FIG. 3. FIG. 3(*a*) shows a circuit being a reversal of the circuit of FIG. 1 in respect to the grounding point, which is located between the input a-c voltage source and the diode element D. In this arrangement the diode element D is grounded at one end. Hence this diode may be replaced with a MOS field effect transistor with its source grounded, as shown in FIG. 4. In practice, however, the input voltage often includes a d-c voltage which is superposed on the a-c component, and the circuit is unfavorably affected by such d-c component. FIG. 3(*b*) shows a rectifier circuit operable free of the d-c component in the input voltage. In this arrangement the connection point of the resistor $R_2$ to the input voltage source E is shifted to the ground side. With this change, an a-c current flows in the resistor $R_2$ but the value of the a-c voltage applied to the series circuit of diode element D and resistor $R_1$ is not effected provided that the value of the capacitor $C_1$ is large enough, its a-c impedance is negligible, and the internal resistance of the input a-c voltage source E is negligibly small. Thus, in this circuit, the rectified d-c current component flowing in the resistor $R_2$ is the same as that in the circuit of FIG. 3(a). In the circuit of FIG. 3(a), the rectified d-c current I flows through the loop comprising the input voltage source E, resistors $R_1$ and $R_2$, and diode element D. While, in the circuit of FIG. 3(*b*), the rectified current I flows through the loop comprising the resistors $R_2$ and $R_1$, and diode element D. Both the currents I are equal. Because one terminal of the d-c ammeter for the measurement of the rectified current is grounded, the circuit of FIG. 3(b) is easier to design and operate than the circuit of FIG. 3(a).

In the circuits of FIGS. 3(*a*) and 3(*b*) the quasi-RMS value can be derived from the point P in terms of rectified voltage. In either circuit, the a-c input voltage E is superposed on the rectified voltage at the point P. The a-c voltage component does not affect the measurement indication on a d-c voltmeter. Also, if necessary, this a-c component may be removed by the use of a filter circuit.

FIG. 4 schematically shows a rectifier circuit embodying this invention wherein a MOS field effect transistor T is used in place of the diode element D shown in FIGS. 3(*a*) and 3(*b*). The source of the transistor T is grounded, and the drain is connected to the resistor $R_1$. The voltage emerging at the connection point of the resistor $R_1$ and the capacitor $C_1$ represents the sum of the input a-c voltage and the d-c voltage developed as the result of rectification. This summed voltage is amplified by the amplifier A, and the resultant output voltage is applied to the gate of the MOS field effect transistor T. The amplification factor of this amplifier is large enough so that the conduction between the source and the drain can be controlled by the voltage applied to the gate even if the input voltage is small.

Figure 5:
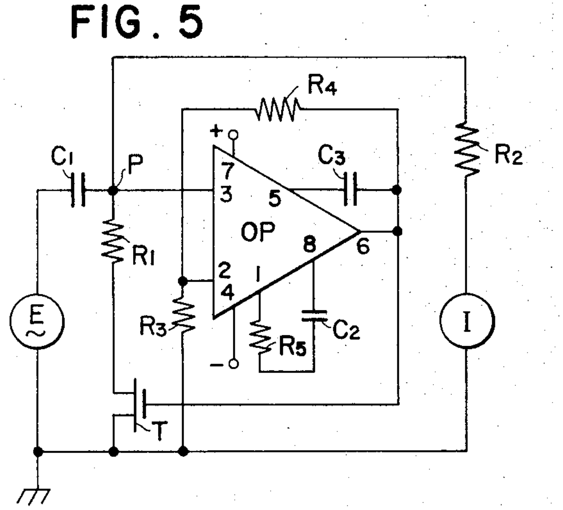

The amplifier A is to amplify both the d-c and a-c components of the input voltage applied to it and, hence, this amplifier must be a wide-band d-c amplifier. In the practical circuit, the use of an integrated circuit type operational amplifier with a wide-bandwidth is desirable. FIG. 5 schematically shows an example of the circuit using such operational amplifier wherein the reference OP denotes a 709 type operational amplifier, 2 an inverted-input terminal, 3 a noninverted-input terminal, 6 an output terminal, 7 and 4 a positive and a negative power supply terminal respectively, and 1 and 5 and 8 frequency compensation terminals. The resistor $R_5$, capacitors $C_2$ and $C_3$ are used as compensation elements. The amplification factor of the operational amplifier OP is determined by the ratio of the resistor $R_4$ to $R_3$, whose maximum is limited by the temperature effect of the operational amplifier. Normally the amplification factor is determined to be several hundreds. In the circuit of FIG. 5 when an N-channel type field effect transistor T is used, the drain-source conduction becomes on when the gate potential is positive with respect to the source, or it remains non-conducting when the gate is at a negative potential with respect to the source. Therefore, even if the input voltage is small, the transistor T performs perfect switching action in response to the polarity of the gate voltage. In other words, the transistor T performs almost ideal switching action equivalent to that of a diode, thus offering satisfactory rectifying function. The MOS field effect transistor in this circuit is desirable because its gate insulation is good enough to result in no current leakage from the gate even when a fairly high voltage from the output of the amplifier is applied to the gate for switching action.

In the circuit as in FIG. 4(*b*), an a-c current flows in the resistor $R_2$ as in FIG. 3(*b*). This a-c current does not affect the indication on the d-c meter. The rectified value can be derived as a voltage from the point P shown in FIG. 4(*a*) or 4(*b*), and the a-c component can easily be removed by the use of a filter circuit. Another method of deriving the rectified value as a voltage is such that two voltage sources with mutually opposite phases are used for the input a-c voltage source, and the circuit as in FIG. 4 is used for each of these voltage sources. Then the a-c components of the voltages emerging at the points P of the two rectifier circuits are opposite to each other with respect to phase. By averaging these voltages, it becomes possible to obtain a rectified voltage from which the a-c component has been removed without use of a filter circuit. According to this method, the rectifier circuit does not use a filter circuit which requires a relatively large time constant. This serves to improve the response in the measurement operation.

Referring to FIG. 2, there is shown rectifying characteristics in comparison; the solid line indicates one according to this invention, and the dotted line stands for one by the conventional rectifier circuit using a usual diode element. The latter shows that the linearity is lost in the range of input a-c voltage below several hundred millivolts. Whereas, according to the invention, the input-output linearity is maintained over a far wider range of input a-c voltage, even down to several millivolts. This makes it possible to extend markedly the dynamic range of a measuring instrument. With the rectifier circuit of this invention, when used with a logarithmic amplifier, it becomes possible to realize a quasi-RMS indicating type measuring instrument which is useful for the measurement of sound or vibration whose amplitude varies over a wide range.

To extend the dynamic range of the rectifier circuit in the prior art, it has been the practice to associate diode elements in the negative feedback circuit of the amplifier. This circuit, however, operates in the mean value indicating type rectification characteristic and cannot be applied to the measurement where the effective value indication or quasi-RMS indication is essential. Developed from this method, another method has recently been proposed, in which the rectifying characteristic is brought near the RMS rectification. This method requires more complicated circuit arrangement than the method of this invention. Furthermore the proposed method must use many integrated circuits resulting a characteristic which is prone to be effected by the temperature variation of the measuring site.

In the foregoing circuit of FIG. 4, the transistor T has its source grounded. If it is not desired to ground the source, the power supply for the amplifier A and the grounding point of the source of the transistor T may be both floated. By this arrangement, the rectifier circuit of this invention can be operated in a highly linear characteristic in a floating mode.

While a few specific embodiments of the invention, and modifications thereof have been described in detail, it is particularly understood that the invention is not limited thereto or thereby.

What is claimed is:

1. A rectifier circuit using a MOS field effect transistor and high gain feedback operational amplifier comprising: a MOS field effect transistor having source, drain and gate terminals; a resistor connected in the source-drain circuit of said field effect transistor; supply circuit means for supplying an alternating current voltage to be rectified across the series circuit comprised by the resistor and the source-drain of the field effect transistor; and a high gain feedback operational amplifier having its input connected to the supply circuit means and across the series circuit comprised by the resistor and the source-drain of the field effect transistor and having its output connected to the gate terminal of said field effect transistor, said high gain feedback operational amplifier serving to amplify the alternating current voltage which is being applied to the rectifier circuit for rectification and deriving an amplified gate control signal for quickly controlling the conduction state between the source and the drain of said field effect transistor in a fast responding manner even at very low supply alternating current voltage values of the order of several millivolts.

2. A rectifier circuit according to claim 1 wherein the source terminal of the field effect transistor and one side of the a-c voltage source to be rectified are grounded; the supply circuit means for connecting the other side of the a-c voltage source to the rectifier circuit comprises a coupling capacitor; and the drain terminal of the field effect transistor is connected to the resistor to form the series circuit comprised by the resistor and the source-drain of the field effect transistor.

3. A rectifier and measurement circuit according to claim 2 further including a measurement circuit comprised by a d-c ammeter and a second resistor connected in parallel with said coupling capacitor and the alternating current voltage source for measurement of the quasi-RMS current and voltage produced by the rectifier circuit.

4. A rectifier and measurement circuit according to claim 2 further including a measurement circuit comprised by a d-c ammeter and a second resistor connected in parallel with said coupling capacitor for measurement of the quasi-RMS current and voltage produced by the rectifier circuit.

* * * * *